US010928367B2

(12) United States Patent
Kozawa

(10) Patent No.: US 10,928,367 B2
(45) Date of Patent: Feb. 23, 2021

(54) PEAK EXTRACTION METHOD AND PROGRAM

(71) Applicant: SHIMADZU CORPORATION, Kyoto (JP)

(72) Inventor: Hiroaki Kozawa, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 257 days.

(21) Appl. No.: 15/014,534

(22) Filed: Feb. 3, 2016

(65) Prior Publication Data

US 2017/0219542 A1    Aug. 3, 2017

(51) Int. Cl.
*G01N 30/86* (2006.01)

(52) U.S. Cl.
CPC ....... *G01N 30/8631* (2013.01); *G01N 30/861* (2013.01); *G01N 30/8696* (2013.01)

(58) Field of Classification Search
None
See application file for complete search history.

(56) References Cited

U.S. PATENT DOCUMENTS

| 5,121,443 A * | 6/1992 | Tomlinson | G01N 30/8624 |
| | | | 210/656 |
| 5,641,905 A * | 6/1997 | Schwarz | G01H 13/00 |
| | | | 73/579 |
| 2002/0052701 A1 * | 5/2002 | Gorenstein | G01N 30/82 |
| | | | 702/74 |
| 2007/0278395 A1 * | 12/2007 | Gorenstein | G01N 30/8675 |
| | | | 250/282 |
| 2010/0283785 A1 * | 11/2010 | Satulovsky | G01N 27/447 |
| | | | 345/440 |

FOREIGN PATENT DOCUMENTS

| JP | 2001-343324 A | 12/2001 |
| JP | 2004-271422 A | 9/2004 |

OTHER PUBLICATIONS

Shaun Quinn et al. ("Taking the Pain Out of Chromatographic Peak Integration", Dionex Corporation, 2009, p. 1-5).*
Shaun Quinn et al. ("Taking the Pain Out of Chromatographic Peak Integration," Dionex Corporation, p. 1-5) (Year: 2009).*

(Continued)

*Primary Examiner* — Shaun M Campbell
*Assistant Examiner* — Aneta B Cieslewicz
(74) *Attorney, Agent, or Firm* — Sughrue Mion, PLLC

(57) ABSTRACT

A peak extraction method for extracting a true peak from a measured waveform, including acquiring a second derivative waveform; extracting a provisional peak on the basis of a maximum value and/or a minimum value of the second derivative waveform; determining the peak width of the provisional peak on the basis of a model peak function; computing, on the basis of the model peak function, a theoretical value for the height of the provisional peak using two points corresponding to the two ends of the peak width; computing, based on the second derivative waveform, an index value for a variation in the noise on the measured waveform; and computing an S/N ratio, which is a ratio of the peak height theoretical value and the index value, and extracting the provisional peak that is equal to or greater than a preset value as the true peak.

6 Claims, 3 Drawing Sheets

(56) References Cited

OTHER PUBLICATIONS

Fredriksson et al., "An automatic peak finding method for LC-MS data using Gaussian second derivative filtering," J. Sep. Sci. 2009, 32, 3906-3918, (Year: 2009).*

O'Haver, "Pragmatic Introduction to Signal Processing with Applications in scientific measurement", https://terpconnect.umd.edu/~toh/spectrum/IntroToSignalProcessing2020.pdf, pp. 53-71 (Year: 2020).*

* cited by examiner

Second derivative waveform

Provisional peak waveform

PEAK EXTRACTION METHOD AND PROGRAM

TECHNICAL FIELD

The present invention relates to a peak extraction method and program for extracting a peak from a chromatogram and/or a spectrum.

BACKGROUND ART

In liquid chromatography and gas chromatography, a sample is introduced onto a column, components included in the sample are separated as a function of time, and a chromatogram having a retention time as the horizontal axis and a signal intensity as the vertical axis is acquired by detecting these components in sequence. Then, a peak is extracted from the chromatogram, the component is identified from the retention time corresponding to the location of a peak apex, and the quantity of the component is determined from a peak intensity and a peak area.

As disclosed in Patent Document 1, when a chromatogram is acquired by performing programmed temperature analysis in GC and/or gradient analysis in LC, so-called baseline drift, in which the baseline fluctuates as a function of time, often occurs. Accordingly, there has been proposed a method for extracting a peak from a second derivative waveform after the effects of baseline drift have been removed by performing second-derivative signal analysis of the chromatogram (Non-Patent Document 1).

When second-derivative signal analysis is performed on the chromatogram, it is possible to remove the effects of baseline drift, which either increase or decrease linearly. Hypothetically, even when the baseline drift does not increase or decrease linearly, it is still possible to reduce the effects thereof by second-derivative signal analysis because the baseline drift fluctuates gently with a fixed bias.

After performing second-derivative signal analysis of the chromatogram, an extreme value having an absolute value that is equal to or greater than a preset threshold is extracted by taking into account the magnitude of the noise superimposed on the chromatogram, and the location thereof in the waveform obtained by having performed second-derivative signal analysis of the chromatogram is detected as the peak.

Thus far, baseline drift has been explained by giving a chromatogram as an example, but there are cases where baseline drift occurs in the same way in waveforms obtained by other measurements. For example, as disclosed in Patent Document 2, in spectrometry, in a spectrum obtained by computing the difference between reference data acquired without preparing a sample and measured data acquired by preparing a sample, there are cases where baseline drift occurs as the result of differences in the measurement environments when the reference data was acquired and the measured data was acquired (changes in the optical system, changes in temperature, and so forth). Therefore, the effects of baseline drift are also removed using a second derivative when detecting the peak of a spectrum the same as in the case of the chromatogram.

RELATED ART DOCUMENTS

Patent Documents

[Patent Document 1] Japanese Patent Application Laid-Open Publication No. 2004-271422

[Patent Document 2] Japanese Patent Application Laid-Open Publication No. 2001-343324

Non-Patent Document

[Non-Patent Document] Thermo (DIONEX) Software Posters, DIONEX "Taking the Pain Out of Chromatographic Peak Integration," [online], [searched Aug. 12, 2013], Internet.

SUMMARY OF THE INVENTION

Problems to be Solved by the Invention

When finding a second derivative for a chromatogram or spectrum (hereinafter referred to as chromatographs etc.), a waveform that enhances changes in local signal intensity while suppressing gentle changes in signal intensity across a wide range is obtained, thereby reducing the effects of baseline drift and enabling the extraction of a peak. However, since noise superimposed on the chromatogram is also a change in the local signal intensity, the noise is enhanced along with the true peak in the post-second derivative waveform. In particular, when steep waveform noise is superimposed, the noise is greatly enhanced in the post-second derivative waveform, making it impossible to detect a low S/N ratio peak.

The problem to be solved by the present invention is to provide a method, which, when extracting a peak from a measured waveform obtained using chromatography or spectrometry, enables even a low S/N ratio peak to be extracted from among the noise while reducing the effects of baseline drift, and a program for causing this method to be executed on a computer.

Means for Solving the Problem

The present invention, which was made to solve for the aforementioned problems, is a peak extraction method for extracting a true peak from a measured waveform acquired using chromatography or spectrometry, comprising:

a) a second derivative waveform acquisition step for acquiring a second derivative waveform by finding a second derivative of the measured waveform;

b) a provisional peak extraction step for extracting a peak of the measured waveform on the basis of a maximum value and/or a minimum value of the second derivative waveform, and treating same as a provisional peak;

c) a peak width determination step for determining the peak width of the provisional peak on the basis of a preset model peak function theoretical equation for the true peak;

d) a peak height theoretical value computation step for computing, on the basis of the model peak function theoretical equation, a theoretical value for the height of the provisional peak using two points on either the measured waveform or the second derivative waveform that correspond to the two ends of the peak width;

e) a noise index value computation step for computing, based on the second derivative waveform, an index value for a variation in the noise of the measured waveform; and f) a peak extraction step for computing an S/N ratio in accordance with a ratio of the provisional peak height theoretical value and the index value, and extracting the provisional peak, for which the value of the S/N ratio is equal to or greater than a preset value, as the true peak.

The peak extracted using the peak extraction method according to the present invention is not limited to a single peak. When extracting a plurality of true peaks, a plurality of provisional peaks is extracted in the provisional peak extraction step, and a peak width determination and peak height theoretical value computation are performed for each provisional peak.

The model peak function is a typical Gaussian function, but may also be a Lorentz function. Also, the model peak function is not limited to a symmetrical function having the peak apex therebetween, but rather an Exponentially Modified Gaussian (EMG), a BI-Gaussian, or other such asymmetrical function may also be used when the state of the measuring system is taken into account, and, for example, the chromatogram peak is either tailing or fronting.

As will be explained below, in the peak height theoretical value computation step, for example, it is possible to compute a theoretical value for the provisional peak height using the actual measurement values for the aforementioned two points and the height of the peak apex of the provisional peak. In this case, in the provisional peak extraction step, the location of the peak apex of the provisional peak is identified to determine the height of the peak apex.

The configuration may also be such that a coefficient of the model peak function is set by fitting a function, obtained by finding the second derivative of the model peak function, within the range of the peak width in the second derivative waveform, and computing the theoretical value of the model peak height based thereon.

An example of the peak extraction procedure when the model peak function is a Gaussian function will be explained.

First, the location and height H (actual measurement value) of the peak apex of the provisional peak is identified on the basis of the maximum value/minimum value of the second derivative waveform obtained by finding the second derivative of the measured waveform. Next, the locations of inflection points located on both sides of this peak apex are treated as the two points corresponding to the two ends of the peak width. Then, the difference between the height of these two points and the height of the peak apex (H–h) is computed. Since the height of the inflection points is exp(–0.5) times the peak height according to the Gaussian function theoretical equation, the theoretical value $H_0$ of the peak height can be computed using the following Equation (1).

$$H_0 = (H-h)/(1-\exp(-0.5)) \quad (1)$$

The index value of a variation in the noise is typically a standard deviation of the second derivative waveform, but the present invention is not necessarily limited to this, and a value calculated by averaging second derivative waveforms may also be used.

A variety of methods used to date can be used as the method for computing the standard deviation of the noise. For example, it is possible to utilize a method that uses 1.4826 times the Median Absolute Deviation (MAD) of the second derivative waveform as the standard deviation, or a method that uses 1.4826 times the Median of an absolute value of the second derivative waveform as the standard deviation of the noise.

In the peak extraction method according to the present invention, first, a provisional peak is extracted on the basis of the maximum value and/or minimum value of the second derivative waveform of the measured waveform. Next, the theoretical value of the peak height of each provisional peak is computed on the basis of the model peak function theoretical equation. Then, an S/N ratio is computed on the basis of the peak height theoretical value, and the true peak is extracted based on the results thereof. This makes it possible to accurately compute the peak height of even a broad, low peak, and to extract same as the true peak. Therefore, when using the peak extraction method according to the present invention, it is possible to properly extract even a peak with a low S/N ratio from among the noise while reducing the effects of baseline drift.

Furthermore, as in the example described above, by using the height of the two points corresponding to the peak width and the actual measurement value of the peak height of the provisional peak when computing the theoretical value of the peak height of the provisional peak, an accurate peak height is computed for a peak with a shape that conforms to the model peak function, thereby making it possible to more accurately extract a low S/N ratio peak by enhancing the true peak.

Another aspect of the present invention that has been made to solve the aforementioned problems is a peak extraction program that causes processing for extracting a true peak from a measured waveform acquired by chromatography or spectrometry to be executed on a computer, the program causing the computer, which is capable of accessing a storage part in which has been stored model peak function information including a model peak function theoretical equation set for the true peak and threshold information related to an S/N ratio described hereinbelow, to operate as:

a) a second derivative waveform acquisition part for acquiring a second derivative waveform by finding a second derivative of the measured waveform;

b) a provision peak extraction part for extracting a peak of the measured waveform on the basis of a maximum value and/or a minimum value of the second derivative waveform, and setting same as a provisional peak;

c) a peak width determination part for determining the peak width of the provisional peak on the basis of the model peak function theoretical equation;

d) a peak height theoretical value computation part for computing, on the basis of the model peak function theoretical equation, a theoretical value for the height of the provisional peak using two points on either the measured waveform or the second derivative waveform that correspond to the two ends of the peak width;

e) a noise index value computation part for computing, based on the second derivative waveform, index values for a variation in the noise of the measured waveform; and f) a peak extraction part for computing an S/N ratio that is the ratio of the provisional peak height theoretical value and the index value, and extracting the provisional peak for which the value of the S/N ratio is equal to or greater than the threshold as the true peak.

Effects of the Invention

In the peak extraction method according to the present invention, a provisional peak is extracted on the basis of the maximum value and/or the minimum value of the second derivative waveform of the measured waveform, and an accurate peak height is obtained by computing the theoretical value of the peak height thereof. Then, an S/N ratio is computed on the basis of the theoretical value, and a true peak is extracted. Therefore, even a peak with a low S/N ratio can be properly extracted from among the noise while reducing the effects of baseline drift. The same effects can be obtained with the peak extraction program according to the present invention.

DETAILED DESCRIPTION OF THE EXEMPLARY EMBODIMENTS

Figure 1:
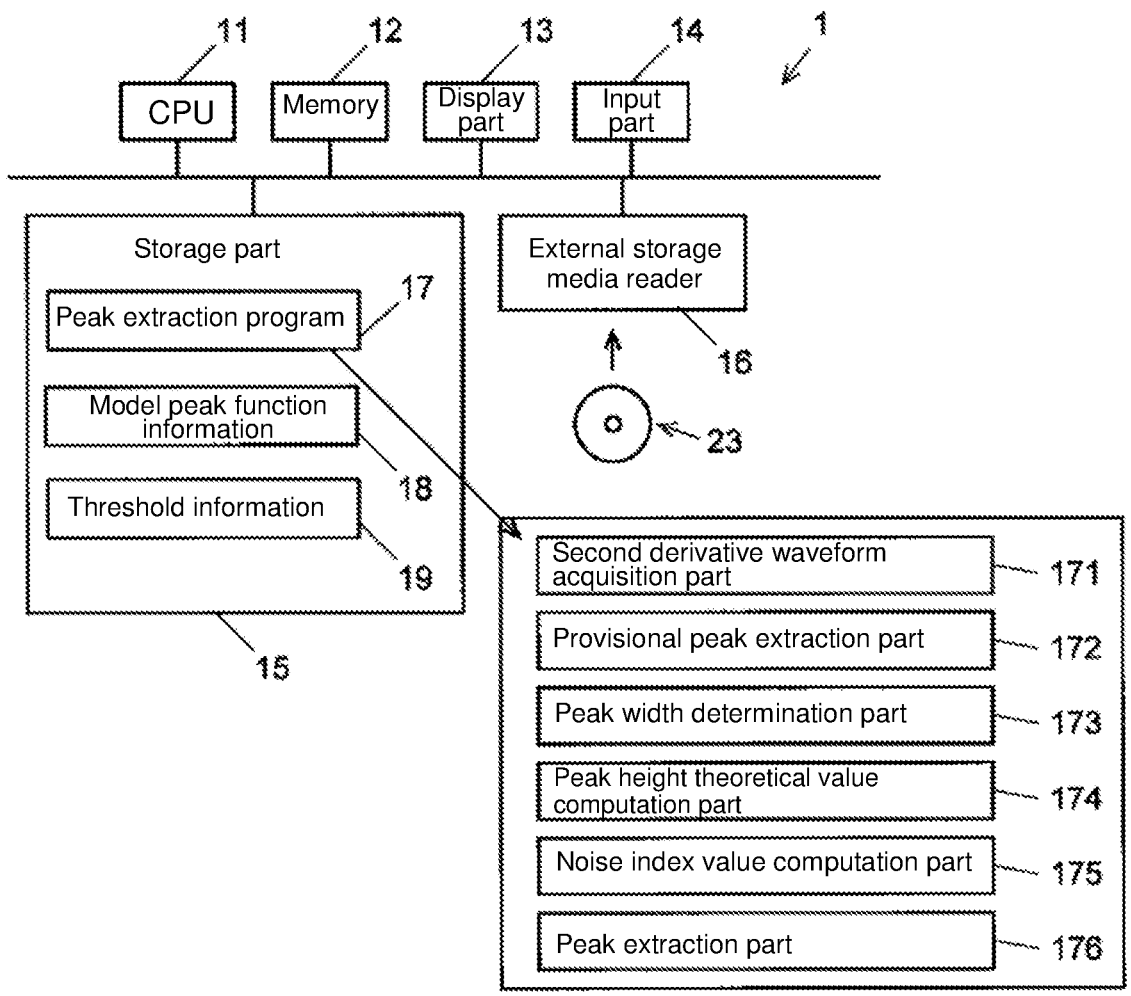
FIG. 1 is a schematic block diagram of a peak extraction apparatus for executing an embodiment of the peak extraction method according to the present invention.
Figure 2:
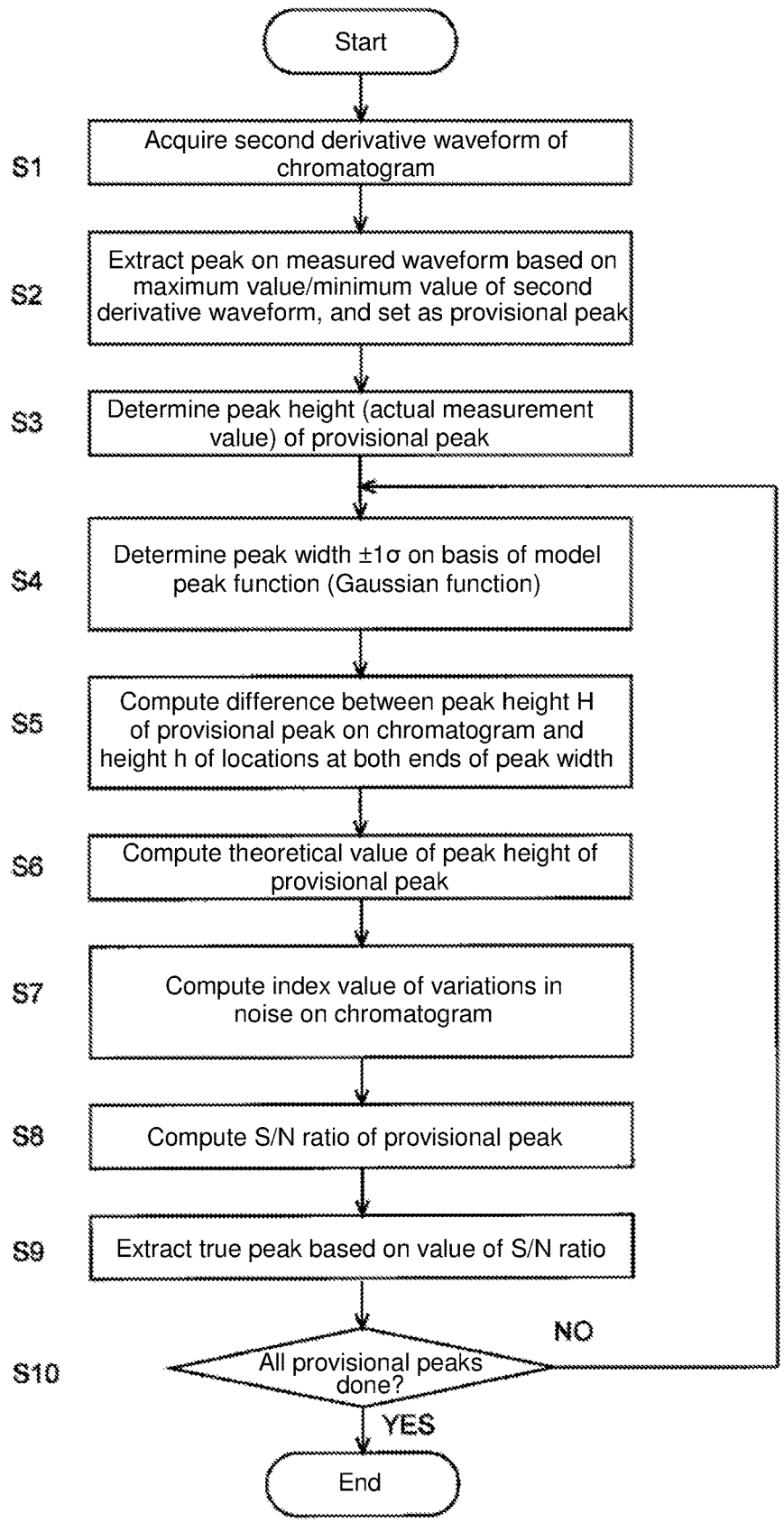
FIG. 2 is a flowchart of the peak extraction method of the present embodiment.

The embodiments of the peak extraction method and the peak extraction program according to the present invention will be explained below by referring to the drawings. FIG. 1 is a schematic block diagram of a peak extraction apparatus for executing an embodiment of the peak extraction method according to the present invention, FIG. 2 is a flowchart of the peak extraction method of the present embodiment, and FIG. 3 (a) is an example of a waveform obtained by finding the second derivative of a measured waveform, and (b) is an example of a provisional peak waveform of a chromatogram of the present embodiment.

The peak extraction apparatus, in essence, is a general purpose computer (PC), and comprises a central processing unit (CPU) 11, a memory 12, a large-capacity storage device (storage part) 15 comprising a hard disk drive (HDD) and a solid state drive (SSD), and an external storage media reader 16. Furthermore, a display part 13, which comprises a liquid crystal display or the like and displays various information, and an input part 14, which comprises a mouse and/or keyboard and via which a user inputs various commands, are connected to the peak extraction apparatus 1.

A peak extraction program 17 is stored in the storage part 15, and in accordance with starting the program 17, the CPU 11 operates as a second derivative waveform acquisition part 171, a provisional peak extraction part 172, a peak width determination part 173, a peak height theoretical value computation part 174, a noise index value computation part 175, and a peak extraction part 176, which will be described hereinbelow. In the present embodiment, the peak extraction program 17 is stored in the storage part 15 and executed from there, but the configuration may also be such that the peak extraction program is stored in a DVD-ROM or other such storage medium 23, and the program is executed by inserting this storage medium into the storage media reader 16.

Model peak function information 18 and threshold information 19, which will be described below, are also stored in the storage part 15. In the present embodiment, it is assumed that the true peak of a chromatogram has a peak shape represented by a Gaussian function, and a Gaussian function theoretical equation and information related to the ratio between the peak height and the height of the locations of the two ends of the peak width in a model peak shaped according to the Gaussian function are stored in the storage part 15 as the model peak function information 18. Furthermore, the configuration may be such that model peak function information 18 related to a plurality of model peak functions is stored, and a model peak function to be used by the user is selected in accordance with an operation via the input part 14.

A procedure for extracting a true peak from a chromatogram using the peak extraction apparatus 1 of the present embodiment will be explained. The chromatogram is acquired via a not-shown chromatograph apparatus, and stored in the storage part 15.

First, the second derivative waveform acquisition part 171 acquires a second derivative waveform by reading a chromatogram from the storage part 15, and finding the second derivative of this waveform utilizing a Savitzky-Golay filter, which is a type of smoothing differential filter (Step S1). Then, the chromatogram and the second derivative waveform are displayed on a screen of the display part 13. In addition, a Gaussian second derivative filter or other such method can also be used as the second derivative method. In either case, the sum of the square of the number of filter systems is normalized so as to become 1.

Next, the provisional peak extraction part 172 identifies the location of a peak by detecting the maximum value and the minimum value of the second derivative waveform. Then, a plurality of peaks that exists in identified locations on the chromatogram is each set as a provisional peak (Step S2). The peak height H of each of the plurality of provisional peaks on the chromatogram, that is, the actual measurement value of the height of each provisional peak is also determined (Step S3). Steps S2 and S3 are performed for all provisional peaks.

Figure 3A:
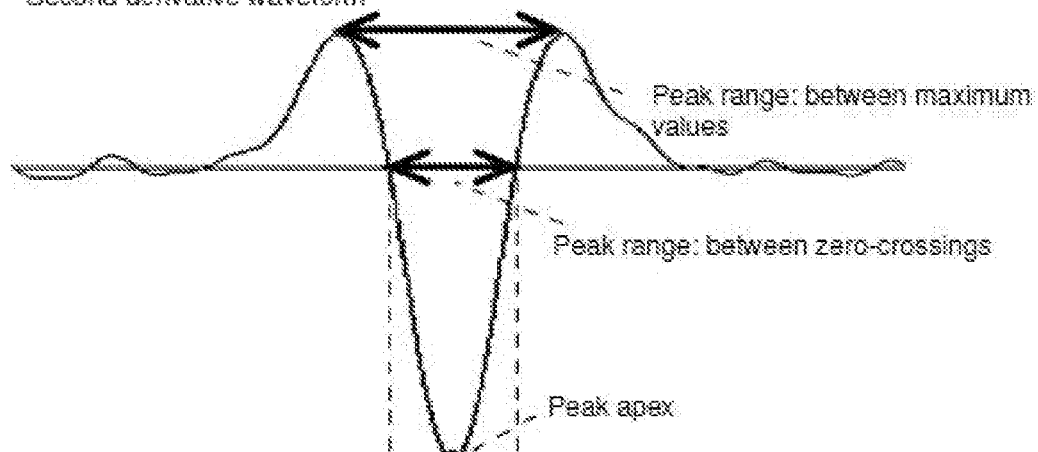
FIG. 3 (a) is an example of a waveform obtained by finding the second derivative of a measured waveform, and (b) is an example of a provisional peak waveform of a chromatogram of the present embodiment.
Figure 3B:
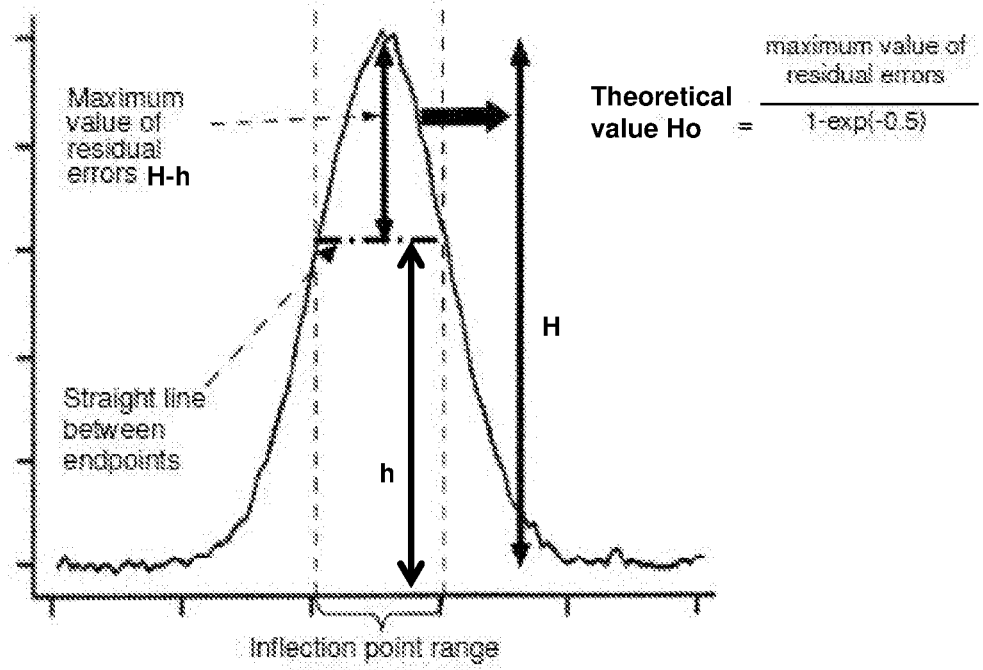

Next, the peak width determination part 173 detects a zero-crossing point of the second derivative waveform (the point where the second derivative waveform crosses the horizontal axis), and determines the zero-crossing points located on two sides with the peak apex therebetween as the locations corresponding to the two ends of the peak width (refer to FIG. 3(a)). Then, two points on the chromatogram corresponding to the two zero-crossing points of the second derivative waveform are set in locations corresponding to the two ends of the peak width. That is, the peak width on the chromatogram is determined on the basis of the second derivative waveform (Step S4).

Furthermore, in the present embodiment, the peak width ($\pm 1\sigma$) is determined based on the locations corresponding to the zero-crossing points, but the points set as the two ends of the peak width change as appropriate in accordance with the properties of the model peak function. In a case where the model peak function is a Gaussian function, besides the zero-crossing points, the locations corresponding to the peak width ($\pm\sqrt{3}\sigma$) may be determined on the basis of the location of the maximum value (or minimum value) located at two ends of the minimum value (or maximum value) corresponding to the peak apex in the second derivative waveform.

When determining the peak width of the chromatogram, the peak height theoretical computation part 174 detects the height h of the locations corresponding to the two ends of the peak width on the chromatogram. Then, the difference H−h with the peak height actual measurement value H described hereinabove is computed (Step S5). In a model peak according to a Gaussian function, the height at the locations corresponding to the two ends of the peak width constitute exp (−0.5) times the peak height of the model peak. Accordingly, the theoretical value $H_0$ of the peak height of the provisional peak is computed using Equation (1) below (Step S6).

$$H_0 = (H-h)/(1-\exp(-0.5)) \qquad (1)$$

Next, the noise index value computation part 175 computes a noise index value, which is the index value of a variation in the noise of the measured waveform (Step S7). In the present embodiment, the index value of a variation in the noise is computed using a standard deviation of the second derivative waveform. The noise variation index value is not limited to this, and a value calculated by averaging the second derivative waveforms can be found, as appropriate.

In the present embodiment, the Median Absolute Deviation (MAD) of the second derivative waveform can be computed, and 1.4826 times that value can be used as the standard deviation, that is, as the noise variation index value. Another suitable method, such as a method that uses 1.4826 times the Median of the absolute value of the second derivative waveform as the standard deviation of the noise can also be used to compute the noise variation index value.

In the present embodiment, the computation of the noise variation index value by the noise index value computation part 175 (Step S7) is performed after the computation of the peak height theoretical value of the provisional peak by the peak height theoretical value computation part 174 (Step S6). However, the computation of the noise variation index value can be executed independently of Steps S2 to S5 in which computations and the like are performed relative to the provisional peak. Therefore, Step S7 comes after the second derivative has been acquired in Step S1, and can be executed at an arbitrary point in time (to include being performed in parallel with Steps S2 to S6) up until the value of the S/N ratio of the provisional peak is computed in Step S8, which will be described below.

When the computations of the peak height theoretical value of the provisional peak and the noise variation index value are complete, the peak extraction part 176 determines the S/N ratio of the provisional peak by computing the ratio between the theoretical value and the index value (Step S8). Then, the threshold stored in the storage part 15 and the S/N ratio value are compared, and the provisional peak for which the value of the S/N ratio is equal to or greater than the threshold is extracted as the true peak (Step S9).

Upon finishing peak extraction on the basis of the S/N ratio value of the provisional peak, the peak extraction part 176 makes a determination as to whether or not the processing of all the provisional peaks set in Step S2 has been completed, and in the case where there exists a provisional peak for which processing has yet to be performed (NO in Step S10), returns to Step S4 to execute the processing for the unprocessed provisional peak. However, the computation of the noise variation index value (Step S7) is skipped for the second and subsequent times that the processing is performed. Then, when the processing for all the provisional peaks is complete (YES in Step S10), the peak extraction part 176 completes the operation by displaying on a screen of the display part 13 the true peak superimposed on the chromatogram, and the true peak profile (elution time, intensity, peak area, and so forth).

As described hereinabove, in the peak extraction method of the present embodiment, first of all, provisional peaks are extracted on the basis of the maximum value and/or the minimum value of the second derivative waveform of the measured waveform. Next, a theoretical value of the peak height of each provisional peak is computed on the basis of the model peak function theoretical equation. Then, an S/N ratio is computed on the basis of the peak height theoretical value, and the true peak is extracted based on the results thereof. This makes it possible to accurately compute the peak heights of all true peaks to include broad, low peaks. Therefore, even a peak with a low S/N ratio can be properly extracted as the true peak.

The embodiment described above is illustrative, and can be changed as appropriate in accordance with the gist of the present invention.

In the above embodiment, the peak extraction apparatus and the chromatograph apparatus are separate apparatuses, but the peak extraction program can be installed in the chromatograph apparatus and executed.

Furthermore, the configuration may be such that the threshold information 19 is either set or changed on the basis of a user operation via the input part 14.

In the above embodiment, an example of a case in which a true peak is extracted from a plurality of provisional peaks was explained, but in addition, for example, the method of the present embodiment can also be used in a case where a determination is made as to whether or not a single peak, which is a measured waveform, is the true peak. In this case, there is no need to set a provisional peak (Step S2), or to make a determination as to whether or not the processing for all provisional peaks has been completed (Step S9).

In the above embodiment, the theoretical value of the peak height of the provisional peak is computed based on the difference between the height h of the location corresponding to the peak width of the provisional peak and the actual measurement value of the peak height H of the provisional peak, but the configuration may be such that the theoretical value of the peak height is determined by determining two points corresponding to the peak width on the chromatogram or the second derivative waveform thereof, and fitting the model peak function within that range. Specifically, the theoretical value of the peak height can be determined either by using two points corresponding to the peak width of the provisional peak on the chromatogram and setting the coefficient of the model peak function so as to pass through these two points, or by using two points on the second derivative waveform corresponding to the two ends of the peak width and setting the coefficient of the second derivative waveform of the model peak function so as to pass through the two points on the second derivative waveform.

In the above embodiment, a case in which the true peak is extracted from a chromatogram was explained, but a peak can be extracted using the same method and program described hereinabove for a waveform of a spectrum or the like acquired using spectrometry.

DESCRIPTION OF REFERENCE SIGNS

1 . . . Peak extraction apparatus
11 . . . CPU
12 . . . Memory
13 . . . Display part
14 . . . Input part
15 . . . Storage part
16 . . . External storage media reader
17 . . . Peak extraction program
171 . . . Second derivative waveform acquisition part
172 . . . Provisional peak extraction part
173 . . . Peak width determination part
174 . . . Peak height theoretical value computation part
175 . . . Noise index value computation part
176 . . . Peak extraction part
18 . . . Model peak function information
19 . . . Threshold information

What is claimed:
1. A peak extraction method for extracting a true peak from a measured waveform acquired of a component included in a sample using chromatography to identify the component, comprising:
acquiring the measured waveform of the component included in the sample by a chromatograph apparatus;

executing by a processor or a central processing unit (CPU):

a) a second derivative waveform acquisition step for acquiring a second derivative waveform by finding a second derivative of the measured waveform of the component;

b) a provisional peak extraction step for extracting a peak of said measured waveform of the component on the basis of a maximum value and/or a minimum value of said second derivative waveform, and treating said extracted peak as a provisional peak;

c) a peak width determination step for determining a peak width of said provisional peak on the basis of a preset model peak function theoretical equation for said true peak;

d) a peak height theoretical value computation step for computing, on the basis of said preset model peak function theoretical equation, a theoretical value for a height of said provisional peak using two points on either said measured waveform or said second derivative waveform corresponding to two ends of said peak width;

e) a noise index value computation step for computing, based on said second derivative waveform, a noise index value for a variation in a noise of said measured waveform of the component;

f) a peak extraction step for computing an S/N ratio, which is a ratio of said provisional peak height theoretical value and said noise index value, and extracting the provisional peak, for which a value of the S/N ratio is equal to or greater than a preset value, as the true peak;

g) a display step for displaying the extracted true peak of the measured waveform of the component; and h) an identification step for identifying the component based on the extracted true peak that is displayed.

2. The peak extraction method according to claim 1, wherein, in said peak width determination step, the peak width of said provisional peak is determined on the basis of either two zero-crossing points located on two sides having therebetween a location in which either the minimum value or the maximum value appears in said second derivative waveform, or two points corresponding to either the maximum value or the minimum value that exists on two sides having therebetween the location in which either the minimum value or the maximum value appears in said second derivative waveform.

3. The peak extraction method according to claim 1, wherein, in said peak height theoretical value computation step, the theoretical value of the peak height of said provisional peak is computed using a difference between a height of a location corresponding to one of the two ends of said peak width of said provisional peak and an actual measurement value of the peak height of said provisional peak on said measured waveform.

4. The peak extraction method according to claim 1, wherein, in said peak height theoretical value computation step, the theoretical value of the peak height of said provisional peak is computed by fitting the preset model peak function theoretical equation within a range corresponding to the peak width of said provisional peak on said second derivative waveform.

5. The peak extraction method according to claim 1, wherein in said noise index value computation step, the noise index value of the noise variation is computed by computing either a Median Absolute Deviation of said second derivative waveform or a median of an absolute value of said second derivative waveform.

6. A non-transitory computer-readable medium including a peak extraction program for extracting a true peak from a measured waveform of a component included in a sample acquired by a chromatogram apparatus to be executed by a processor to identify the component, the peak extraction program causing the processor, which is capable of accessing a storage that stores a model peak function information including a model peak function theoretical equation set for said true peak, and an S/N threshold information related to an S/N ratio, to execute a method of:

a) a second derivative waveform acquisition step for acquiring a second derivative waveform by finding a second derivative of the measured waveform of the component;

b) a provisional peak extraction step for extracting a peak of said measured waveform of the component on the basis of a maximum value and/or a minimum value of said second derivative waveform, and setting said extracted peak as a provisional peak;

c) a peak width determination step for determining a peak width of said provisional peak on the basis of said model peak function theoretical equation;

d) a peak height theoretical value computation step for computing, on the basis of said model peak function theoretical equation, a theoretical value for a height of said provisional peak using two points on either the measured waveform or the second derivative waveform corresponding to two ends of said peak width;

e) a noise index value computation step for computing, based on said second derivative waveform, a noise index value for a variation in a noise of said measured waveform of the component;

f) a peak extraction step for computing the S/N ratio, which is a ratio of said provisional peak height theoretical value and said noise index value, and extracting the provisional peak, for which a value of the S/N ratio is equal to or greater than said S/N threshold, as the true peak;

g) a display step for displaying the true peak of the measured waveform of the component; and h) an identification step for identifying the component based on the true peak that is displayed.

* * * * *